H. Winslow
Cracker Machine
Nº 1,896. Patented Dec. 14, 1840.
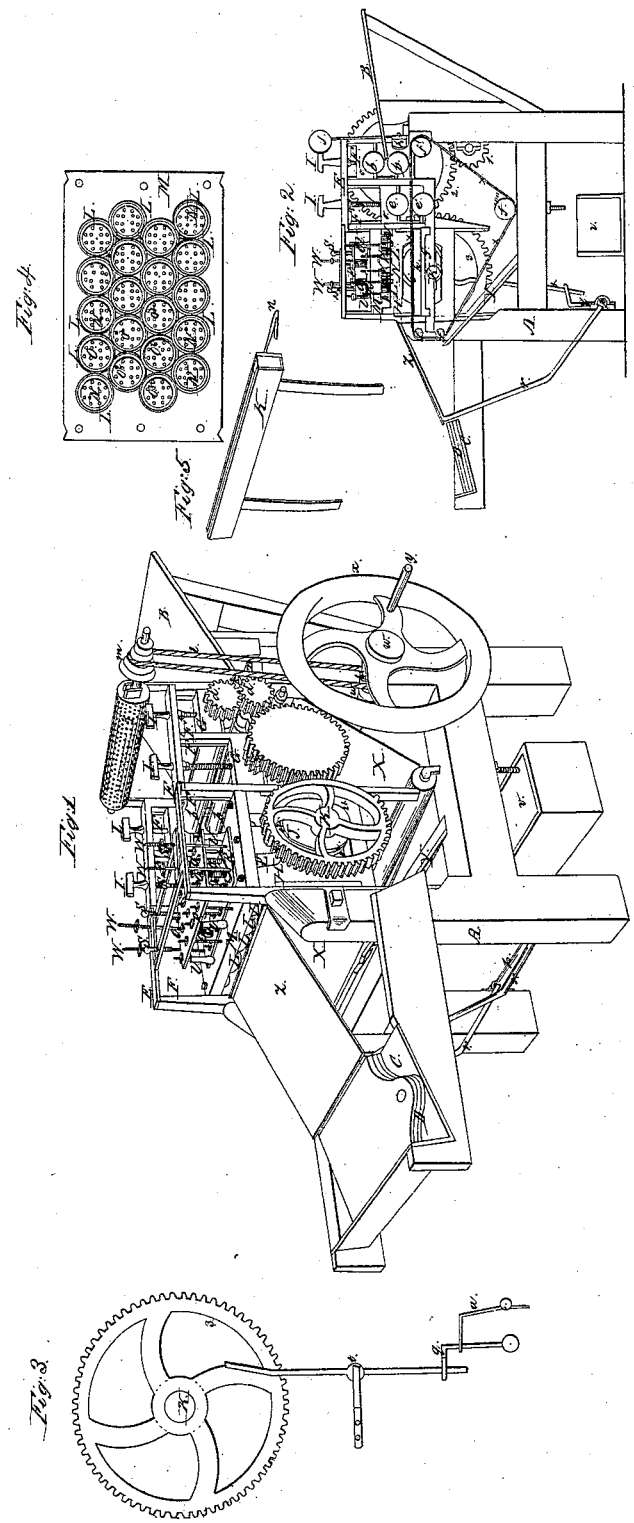

UNITED STATES PATENT OFFICE.

HUMPHREY WINSLOW, OF SWANSEA, MASSACHUSETTS.

MACHINE FOR MAKING CRACKERS.

Specification of Letters Patent No. 1,896, dated December 14, 1840.

*To all whom it may concern:*

Be it known that I, HUMPHREY WINSLOW, of Swansea, in the county of Bristol and State of Massachusetts, have invented a new and useful Machine for Making Crackers, which is described as follows, reference being had to the annexed drawings of the same, making part of this specification.

Figure 1 is a perspective view of the machine. Fig. 2 is a vertical section at the line $x\ x$ of Fig. 1; Fig. 3, section showing the gearing for moving the conveyer. Fig. 4 under side of the cutter plate; Fig. 5 vibrating sifter.

Similar letters refer to similar parts in the figures.

The main frame A of the machine is made of timber of suitable size and strength, consisting of four posts, and side and end rails mortised and tenoned into them. The inclined feeding board B upon which the dough is first put and from which it is fed to the flattening rollers is placed and secured at one end of the main frame, which, for distinction, may be called the front end and is properly braced thereto. The discharging board C is also secured to the main frame in an inclined position at the other or rear end thereof. On this board are placed a number of small boards D which receive the crackers from the conveyer Z, and by which boards D the crackers are carried to the peel.

The metallic frame E containing the principal movable parts of the machine is made in one piece and is secured to the top of the main frame in a permanent manner by vertical screw bolts entering nuts let into the posts. This frame contains the flattening rollers, the drawing rollers, the cutters, duster, dischargers, and table besides the set screws, spiral springs, and several other parts. The sides have oblong openings F in them to allow the boxes G containing the gudgeons of the upper rollers to rise and fall therein for regulating the position and the distance apart of the same from those below them and for permitting the stock H to which the cutters, &c., are secured to rise and fall, the sides of said openings being made V shaped to enter V shaped grooves in the boxes and stock. The first opening F is nearest the front end of the machine and contains the boxes of the flattening rollers, the upper ones of which boxes are raised or lowered by set screws I passing down through the top of the frame to which said boxes are suspended. The second opening F″ is in the middle and contains the boxes of the drawing rollers which are raised and lowered in the same manner as those just mentioned. The third opening F′ which is the largest, is next the rear end of the frame and contains the rising and falling stock H of the cutters which is raised and lowered by means of an eccentric wheel J fixed on a horizontal shaft K passing transversely across the frame and turning in fixed boxes therein said shaft being turned in the manner hereafter described.

The cutters L consist of a nest of circular metallic cups L projecting down from the under side of a horizontal plate M fastened to the before described rising and falling stock H and at certain points touching each other on their peripheries at which points they will not cut the sheet of dough entirely through being scalloped on the cutting edge for that purpose so that the crackers will be united at these points in order that each sheet of crackers will remain whole for the convenience of removing them, the other parts of the cups will cut the sheet of dough entirely through. They are furnished with the usual descriptions of dockers $O^2\ O^2\ O^2$ Fig. 4.

A set of pistons N for discharging the crackers from the cutters are placed in them and perforated to allow them to pass over the dockers, they are attached to the lower ends of the vertical rods O which pass freely through the cutter plate and are fastened by screws and nuts to another horizontal plate P called the piston plate which plate rests upon spiral springs Q placed between it and the scrap plate R hereafter described in order to suspend the pistons in a proper position in the cups or cutters and as the cutters rise from the sheet of dough with the crackers in them said piston plate P strikes against set or stop screws S in the top of the metallic frame E which causes the spiral springs to contract against the scrap plate R and the pistons N to descend in the cups L and discharge the crackers therefrom upon a conveyer Z, to be described, and as the cups again descend the springs expand and the pistons rise to their former positions while the springs are again contracted against the piston and scrap plates; the piston plate being prevented from descending too low by loose gage tubes U put over the piston rods between the cutter plate M and the piston plate R resting on the former.

The dischargers, V, for separating the scraps from the crackers and retaining them upon the apron to be conveyed by it to the inclined board Y are fastened to the under side of another plate R above mentioned called the scrap plate, placed between the two plates M—P before described which plate R is suspended from the head of the frame by four vertical rods W passed loosely through apertures in the top of the frame with nuts on their upper ends between which plate R and the piston plate P above described are placed the spiral springs Q above mentioned retained in place by the vertical piston rods O fastened to said upper plate P and which rods O pass loosely through apertures in the middle or scrap plate and through apertures in the cutter plate M.

As the cutters L descend the scrap plate R and dischargers V descend with them until the nuts on the ends of the rods W which suspend said plate strike against the top of the metallic frame E when the downward motion of the plate R and scrap dischargers V are arrested—at the same time contracting the springs Q then as the cutters L rise these springs extend themselves and force the scrap plate R to retain the same position which causes the dischargers V to push the scraps from the cutters which drop upon the apron X while the crackers are raised in the cutters. The spiral springs thus performing the double office of holding the scrap plate R and dischargers down and keeping the piston plate and pistons up; the conveyer Z is now brought under the cups by the action of the gearing, the cutter plate M and cutters L continue to ascend, the piston plate M strikes against the stop screws S passed through the head of the frame E and is arrested in its upward movement and the cutter plate continuing to ascend with the cutters and the pistons therein remaining stationary, the crackers will of course be discharged therefrom upon the conveyer Z which is instantly moved out from under the cutters by the action of a spring a. The pistons are prevented from descending too low so as to be in danger of leaving the cutters by the gage tubes U before mentioned which are put over the corner and middle piston rods against which tubes the piston plate strikes which arrests the upward motion of the cup plate M.

The two flattening rollers b b for flattening the dough into a broad sheet of the thickness of the required crackers, are placed parallel to each other the one over the other at the lower edge of the inclined feeding board, the gudgeons of the upper roller turning in the before described sliding boxes a by which they are adjusted, the lower boxes being stationary. The dough passes from the feeding board B between these rollers which flatten it. The teeth of the cog wheels d d on the ends of these rollers are made long to prevent them becoming disengaged as the upper roller is raised from the lower one to make a thicker sheet of dough.

The two drawing rollers e e' for moving the apron X and drawing forward the sheet of dough to the cutters are placed about the middle of the frame a little lower than the flattening rollers—the gudgeons of the upper one turning in the before described sliding boxes G for regulating its distance from the lower roller which rollers are for the purpose of moving the endless apron X and drawing forward the dough thereon.

The rollers f' f'' f''' f'''' carrying the endless apron are arranged at follows: The first f' is placed at the front end of the frame below the flattening rollers and parallel with them. The second e' is the lower drawing roller just described. The third f''' is placed at the rear end of the frame near the upper end of the inclined board y for discharging the scraps. The fourth f'' is placed below this roller and the fifth f'''' is placed below the drawing rollers, about the middle of the main frame.

The endless apron X for carrying forward the dough is passed around these rollers.

The table g upon which the cutting is performed is placed under the revolving apron immediately below the cutters. It consists of a horizontal plate g fixed to the before described metallic frome upon which is placed a board and upon this a cushion i and on this the cutting is performed.

The dusters j k for dusting the rollers are placed at the front end of the frame, one above the feeding board and the other below it, the upper one j revolves and the lower one k vibrates—both are composed of wire cloth and filled with flour—the upper one is turned by a band l and pulley m the lower one k is vibrated by a bent rod n attached to it and brought against the cogs of one of the cog wheels d of the flattening rollers, which as it revolves moves the rod and shakes the duster.

The conveyer Z for receiving the crackers from the cups and conveying them to the boards D on the inclined discharging board c consists of a rectangular metallic plate z attached to two long parallel bent rods r r extending down to a horizontal transverse vibrating axle p which vibrates on gudgeons in boxes fixed to the rear posts of the main frame near the lower ends thereof which axle is moved around toward the cutters in order to bring the conveyer under them by means of a crank $q$ which is struck by a lever $s$ turning on a pin $t$ as a fulcrum inserted in the main frame which lever is operated on by a stud $u$ projecting from the face of one of the cog wheels 3 on the eccentric wheel shaft K as it revolves and said conveyer is brought back to its discharging position as represented in the drawing by a spring $a$ attached to the frame and to one of the bent rods of the plate. The crackers when discharged from the conveyer are received upon the boards D by which they are carried to the peel.

The inclined board $y$ for conveying the scraps to a receiver $v$ is placed under the cutting table under which a box $v$ is placed to receive the scraps discharged on said board by the revolving apron.

The gearing by which the before described parts are put in motion consists of a main axle $w$ turning in boxes at the front end of the frame on which axle is a fly wheel $x$ for regulating the motion and from which there projects a handle $y$ by which the machine may be operated by any convenient power, and in case of a change in the propelling power the gearing should also be varied to correspond therewith. On the opposite end of this axle is a small cog wheel 1 which meshes into a large cog wheel 2 on the axle of the lower flattening roller, this cog wheel meshes into another large cog wheel 3 on the eccentric wheel axle, on which axle on the opposite end is a segment cog wheel 4, or a wheel only partly cogged meshing into the cog wheel 5 on the lower drawing roller. Said wheel 4 being so cogged for the purpose of only moving the apron while the cutters are rising and to present the blank part of the wheel to the cogs of the wheel 5 of the drawing roller while the cutters are descending which causes the apron to remain stationary during the operation of cutting: the two drawing rollers are geared together by pinions meshing into each other. Also the two flattening rollers. On the main axle there is a grooved pulley 6 around which is passed a band $l$ leading to a pulley $m$ on the axle of the revolving duster by which it is turned.

The eccentric J fixed on the shaft K for raising and lowering the stock H with the cutters &c. is made and operated in the usual manner. It turns in a rectangular opening $o^2$ in the end of the stock H so that when the part of the eccentric J which is farthest from the shaft K touches the upper side of said opening at 20 the cutters will be up and when the reverse takes place—that is when said part of the eccentric bears against the lower side of said opening at 21 the cutters will be down.

What I claim as my invention and which I desire to secure by Letters Patent is—

1. The combination of the dischargers V with the belt for carrying forward the dough as described.

2. The combination of the conveyer Z with the discharging pistons N for discharging the crackers in the manner and for the purpose described.

3. The combination of the piston plate P with the stop screws S in the head of the frame for regulating the motion of the plate as described to which the pistons are attached for discharging the crackers as described.

4. The combination of the spiral springs Q with the discharging plate R for operating the discharges V as described.

5. The combination of the cog wheel 3 pin $u$ lever $s$ arm $q$ and spring $a$ for bringing the conveyer under the cutters to receive the crackers therefrom and for carrying it back to discharge the crackers upon the loose boards D as described.

HUMPHREY WINSLOW.

Witnesses:
 Jos. F. Chan,
 Artemes Z. Brown.